(12) United States Patent
Krasner et al.

(10) Patent No.: US 10,318,474 B1
(45) Date of Patent: Jun. 11, 2019

(54) DATA STORAGE SYSTEM WITH HETEROGENOUS PARALLEL PROCESSORS

(71) Applicant: EMC Corporation, Hopkinton, MA (US)

(72) Inventors: Jonathan Krasner, Coventry, RI (US); Steve Chalmer, Redwood City, CA (US); Bruce Ferjulian, Hudson, MA (US); Ian Wigmore, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 377 days.

(21) Appl. No.: 14/754,865

(22) Filed: Jun. 30, 2015

(51) Int. Cl.
*G06F 13/16* (2006.01)
*G06F 12/0811* (2016.01)
*G06F 15/173* (2006.01)

(52) U.S. Cl.
CPC .... *G06F 15/17318* (2013.01); *G06F 12/0811* (2013.01); *G06F 13/1663* (2013.01); *G06F 15/17331* (2013.01); *G06F 2212/283* (2013.01)

(58) Field of Classification Search
CPC .................. G06F 12/0811; G06F 15/7331
See application file for complete search history.

(56) References Cited

U.S. PATENT DOCUMENTS

| | | | | |
|---|---|---|---|---|
| 2003/0204672 | A1* | 10/2003 | Bergsten | G06F 3/0611 711/114 |
| 2012/0079175 | A1* | 3/2012 | Flynn | G11C 7/1012 711/103 |
| 2014/0074904 | A1* | 3/2014 | Givelberg | H04L 67/10 709/201 |

* cited by examiner

*Primary Examiner* — Edward J Dudek, Jr.
(74) *Attorney, Agent, or Firm* — Anderson Gorecki LLP

(57) ABSTRACT

A storage node such as a storage array or storage server has storage controllers with heterogeneous parallel processors. The CPUs may be used to perform read and write operations. GPUs are used to produce transformed data from raw data. The GPUs may be used to perform various analytic calculations. The GPUs may be interconnected via dedicated communication links.

19 Claims, 4 Drawing Sheets

DATA STORAGE SYSTEM WITH HETEROGENOUS PARALLEL PROCESSORS

CROSS-REFERENCE TO RELATED APPLICATIONS

NA

BACKGROUND

Aspects of this disclosure are generally related to data storage systems. Data storage systems are used to maintain relatively large data sets and support a relatively large number of concurrent users. The basic building blocks of a data storage system may include storage arrays or clustered storage servers. Examples of storage arrays include but are not limited to the Symmetrix and VMAX families of products of EMC Corporation. Each storage array or storage server may include multiple data storage devices, processors and cache resources. The data storage system presents logical storage devices to applications running on host devices and responds to IOs which reference the logical storage devices by using a mapping between the logical storage devices and physical storage devices on which data is stored. A variety of features may be implemented to avoid data loss and maintain data availability.

SUMMARY

All examples, aspects and features mentioned in this document can be combined in any technically possible way.

In accordance with an aspect, an apparatus comprises: at least one non-transitory data storage device; and at least one storage controller adapted to present a logical storage device to a host device, maintain a mapping between the logical storage device and the at least one non-transitory data storage device; and provide the host device with access to the at least one non-transitory data storage device in response to a request which references the logical storage device, the at least one storage controller comprising a heterogeneous parallel processor. In some implementations the heterogeneous parallel processor comprises at least one central processing unit and at least one graphics processing unit. In some implementations the apparatus further comprises a shared memory cache, and the at least one storage controller comprises at least one front end controller which has access to the shared memory cache and presents the logical storage device, and at least one back end controller which has access to the shared memory cache and the at least one non-transitory data storage device. In some implementations the apparatus further comprises a plurality of heterogeneous parallel processors comprising graphics processing units which are interconnected by at least one dedicated communication link. In some implementations the at least one graphics processing unit is adapted to generate transformed data from raw data. In some implementations the raw data and the corresponding transformed data are stored on the at least one non-transitory data storage device. In some implementations the at least one central processing unit is adapted to provide extents of the transformed data stored on the at least one non-transitory data storage device to the host device. In some implementations the transformed data is provided to the host device by the storage controller. In some implementations the at least one graphics processing unit is adapted to perform analytic calculations to support an application running on the host device. In some implementations the analytic calculations comprise pattern matching. In some implementations the at least one graphics processing unit is adapted to perform analytic calculations to support internal operations. In some implementations the at least one graphics processing unit is adapted to perform analytic calculations to support an unsupervised neural-net algorithm for storage tiering.

In accordance with an aspect a method comprises: storing data on at least one non-transitory data storage device; and using at least one storage controller: presenting a logical storage device to a host device; maintain a mapping between the logical storage device and the at least one non-transitory data storage device; and providing the host device with access to the at least one non-transitory data storage device in response to a request which references the logical storage device, the at least one storage controller comprising a heterogeneous parallel processor with at least one central processing unit and at least one graphics processing unit; and selectively performing calculations with ones of the at least one graphics processing unit. In some implementations the method further comprises performing distributed calculations by multiple graphics processing units via at least one dedicated communication link. In some implementations the method further comprises the at least one graphics processing unit generating transformed data from raw data. In some implementations the method further comprises storing the raw data and the corresponding transformed data on the at least one non-transitory data storage device. In some implementations the method further comprises the at least one graphics processing unit performing analytic calculations to support an application running on the host device. In some implementations the method further comprises the at least one graphics processing unit performing pattern matching. In some implementations the method further comprises the at least one graphics processing unit performing analytic calculations to support internal operations. In some implementations the method further comprises the at least one graphics processing unit performing analytic calculations to support an unsupervised neural-net algorithm for storage tiering.

DETAILED DESCRIPTION

Figure 1:
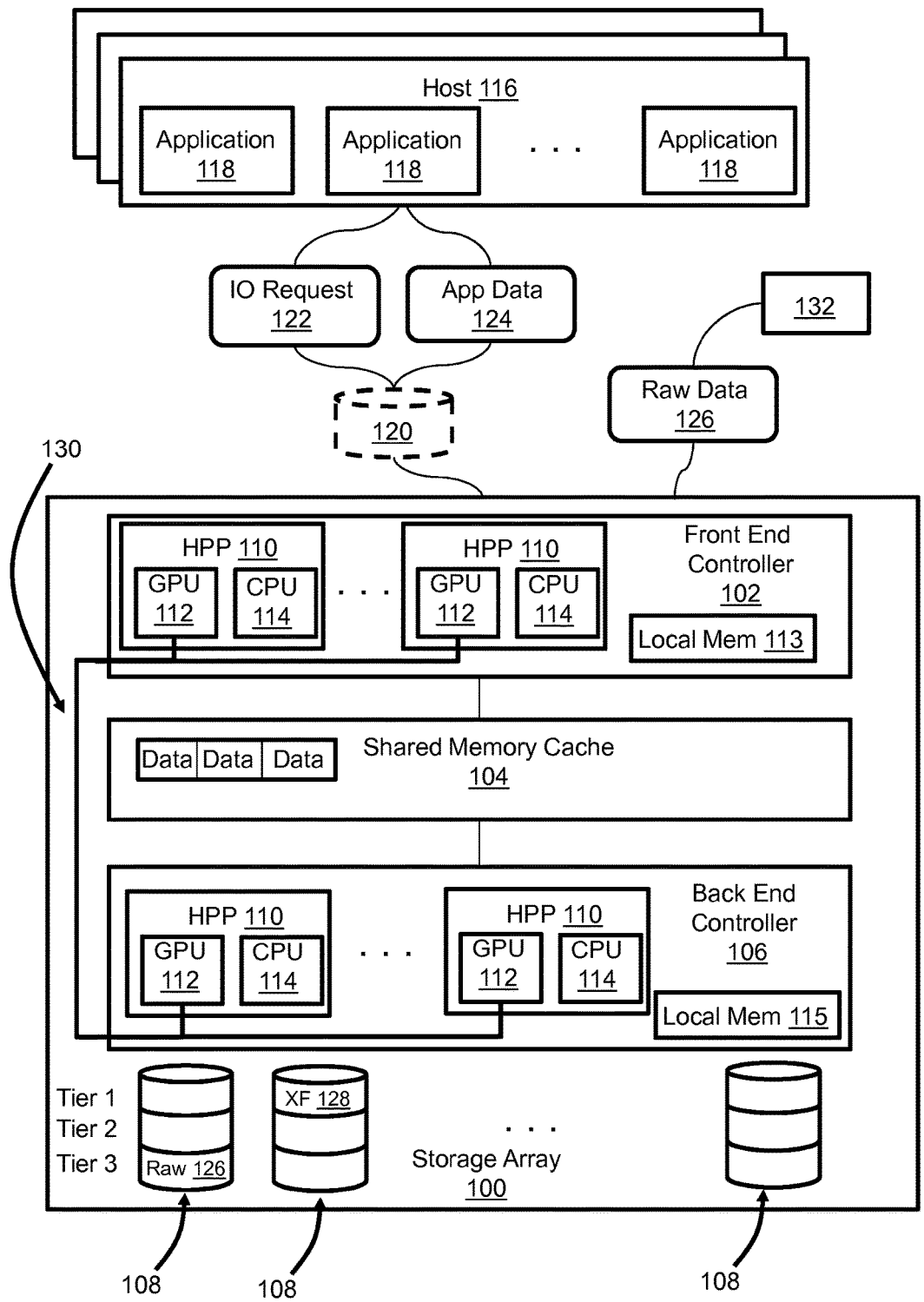
FIG. 1 illustrates a storage array with heterogeneous parallel processors.

FIG. 1 illustrates a data storage system which includes a storage array 100. The storage array 100 maintains data and supports IOs associated with a large number of concurrent users. The storage array may be part of a federated storage system which includes multiple storage arrays and other devices, but for purposes of explanation a single physical device will be described. Subsystems of the storage array 100 include a front end controller 102, a shared memory cache 104, a back end controller 106, and non-transitory physical data storage devices 108.

The front end controller 102 and back end controller 106 each include one or more HPPs (heterogeneous parallel processors) 110. Each HPP includes at least two different types of processors. For example, the different types of processors may have different instruction set architectures. In the illustrated example the different types of processors include a GPU (graphics processing unit) 112 and a CPU (central processing unit) 114. Each GPU and CPU may have multiple cores, but a GPU typically has more cores than a CPU, for example and without limitation by an order of magnitude or more. Further, a CPU is a serialized single-instruction-single-data device, whereas a GPU is a massively parallelized single-instruction-multiple-data device. Each GPU may have hundreds or thousands of cores handling the same instruction stream on multiple data. The GPU and CPU may be implemented on the same die, as different components on a single circuit board, as different components on different circuit boards, or any other of a wide variety of ways. Both the GPUs 112 and the CPUs 114 have access to the shared memory cache 104 and local memory 113, 115 of the respective back end and front end controllers with which they are associated. RDMA (remote direct memory access) data transfer between those memories may be supported. Both the GPUs and CPUs of the back end controller also have access to the storage devices 108. Both the GPUs and CPUs of the front end controller can interface with other devices outside the storage array 100. The front end controller 102 and back end controller 106 may each be implemented as a plurality of separate devices, for example and without limitation, separate cards in a chassis or separate modules in a rack. Moreover, individual subsystems or cards may include both a front end controller and a back end controller.

The GPUs 112 may be interconnected via communication links 130 which are dedicated to communications between the GPUs. The dedicated communication links may include a shared bus, point-to-point links, a mesh, hub-and-spoke, or any of a wide variety of architectures. A wide variety of technologies could be used to implement the dedicated links, including but not limited to PCI (peripheral component interconnect), PCIe (PCI Express), PCI-X (PCI eXtended), AGP (accelerated graphics port), and Ethernet. The interconnection of the GPUs via the dedicated links may enable or facilitate the resources of multiple GPUs to be combined to perform computing tasks in a distributed manner and otherwise facilitate operation without burdening other busses and links.

The shared memory cache 104, which is illustrated as a single logical memory resource, could be implemented in multiple non-transitory physical memory components. For example and without limitation, the shared memory cache could be implemented as multiple volatile memory components such as RAM (random access memory) chips. The memory components may be distributed across multiple physical subsystems, e.g., on separate printed circuit boards associated with different storage directors associated with the front end controller 102 and the back end controller 106. However, other types of memory components could be used and the chips are not necessarily distributed on multiple subsystems.

The physical storage devices 108 may include one type of device or groups of different types of devices. Groups of different types of storage devices may be organized as hierarchical tiers. In the illustrated example the storage devices are organized as tier 1 through tier 3 (shown in horizontal rows), and there are multiple storage devices within each tier. Different technology types of data storage devices have different performance characteristics and different costs per unit of storage capacity. Each tier may be associated with a particular technology type of storage device. For example and without limitation, the storage devices may include one or more flash drives at tier 1, one or more FC (Fibre Channel) drives at tier 2, and one or more SATA (serial advanced technology attachment) drive at tier 3. There may be greater storage capacity at tier 3 than at tier 2, and greater storage capacity at tier 2 than at tier 1. However, a wide variety of implementations are possible in terms of the number of devices, tiers, types of storage devices used at the tiers, and storage capacity at each tier. Moreover, some or all of the storage devices could be non-local relative to the storage array 100. Examples of non-local storage with which the storage devices could be associated include but are not limited to cloud storage and storage nodes of other storage arrays which are associated with storage array 100 in a federated storage system. Cloud storage arrays may include multiple storage arrays or servers and associated storage devices, and the storage arrays or servers and storage devices may be distributed across multiple locations. A federated storage system may include a virtualized storage node based on physical storage node building blocks which may be distributed across multiple locations.

Computing devices such as user terminals and servers use the storage array 100 by communicating with a host device 116. The host device may be a type of server which hosts one or more instances of an application 118. The storage array 100 may support multiple hosts and applications, and the hosts may be within the same data center as the storage array or remotely located relative to the storage array. The storage array may create one or more logical storage devices 120 for each host application, although logical storage devices may be created for any of a variety of purposes. The front end controller 102 presents the logical storage device 120 to instances of the application 118 running on the host device 116. The logical storage device 120, which may be referred to as or by LUN (logical unit number), may be represented as a set of contiguous memory locations in a thinly provisioned virtual volume of storage. The storage capacity allocation associated with the logical device 120 can change over time, e.g., increasing in response to Writes by instances of the application 118. The application and the host device will typically be unaware of the actual location of data on the physical storage devices 108. An IO request 122 sent by an instance of the application 118 to the storage array 100 in order to Read or Write data will reference a location in logical storage device 120. The storage array 100 maintains a mapping between the presented logical storage devices and the physical storage devices. The data that is virtually stored on each logical storage device may be distributed across multiple tiers and multiple storage devices 108.

A section of the shared memory cache 104 is used to temporarily store selected data. For example, data may be copied to the shared memory cache 104 from the storage devices 108 in response to a hint or an IO Read request from the host device 116. This can enhance system performance because when data corresponding to an IO request is in the shared memory cache 104, i.e., a "cache hit," then that cached copy of the data can be used to quickly service the IO request. When the requested data is not in the shared memory cache, i.e. a "cache miss," then that data must be copied by the back end controller 106 from the storage devices 108 into the shared memory cache 104 in order to service the JO request. Data associated with an JO Write request from a host device is initially written to the shared memory cache 104 and subsequently flushed from the cache and written to the storage devices 108. Generally, any data that has not been accessed recently or within a predetermined period of time may be flushed from the cache 104 and written to the storage devices 108. The CPUs may be used to perform read and write operations.

Some or all of the application data 124 that is used by instances of the application 118 may be generated by transforming raw data 126 into transformed data 128. Raw data is transformed by a function which changes the raw data in some way. Simple examples of transforming functions may include mathematical operations such logarithmic functions and exponent (power transform) functions including but not limited to square root, cube root, square and cube functions. A very wide variety of mathematical, logical and other functions may be used to transform raw data into transformed data in order to provide application data.

Figure 2:
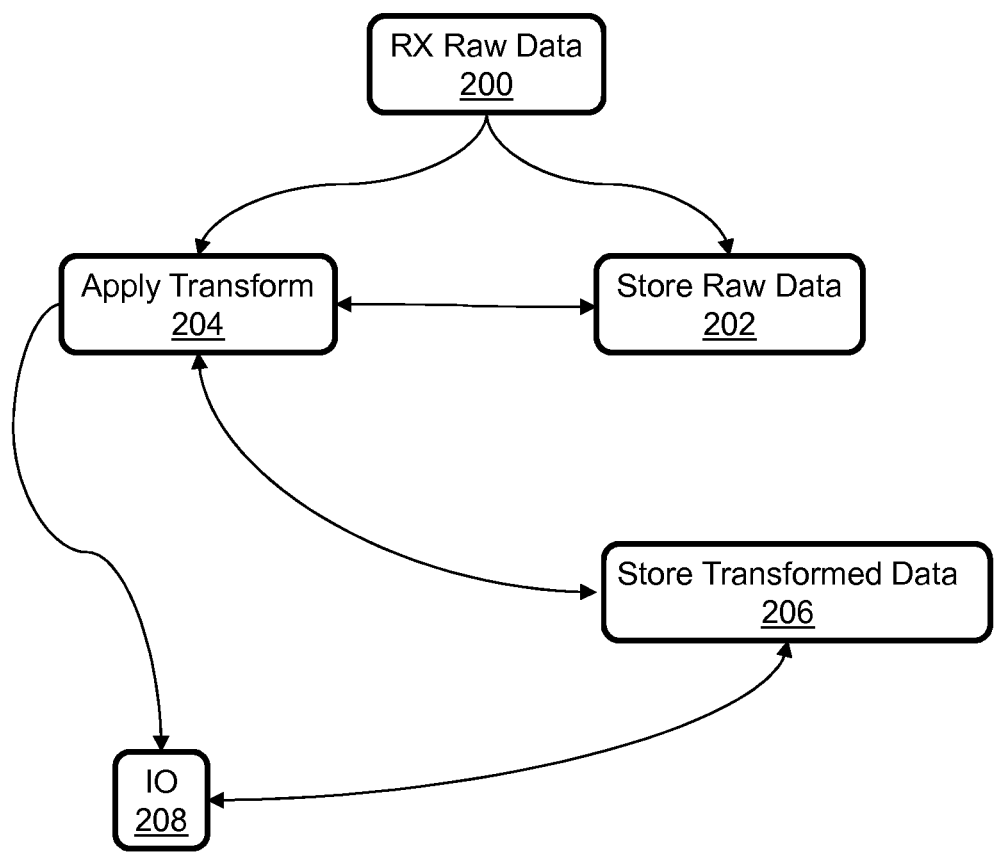
FIG. 2 illustrates performance of ETL transactions using heterogeneous parallel processors.

Referring now to FIGS. 1 and 2, the storage array 100 uses the GPUs 112 to perform ETL (Extract Transform Load) transactions which produce transformed data 128 from raw data 126. As indicated at 200, the raw data 126 is initially received from some source, e.g., an external source 132 such as another storage array. The storage array 100 may store the raw data 126 in storage devices 108 as indicated at 202. The storage array may transform the raw data to produce transformed data 128 as indicated at 204. The storage array may store the transformed data in storage device 108 as indicated at 206. In one example the storage array transforms the raw data to produce transformed data 128 as indicated at 204 and stores both the raw data 126 and the transformed data 128 in storage devices 108 as indicated at 202 and 206. The CPUs 114 handle storage of raw data. For example, raw data 126 received by the front end controller 102 may be written to the shared memory cache 104 under the control of one or more CPUs of the front end controller. CPUs of the back end controller 106 may destage the raw data to the storage devices for storage. Before the raw data is destaged, one or more GPUs associated with the front end controller, back end controller or both may access the raw data from the shared memory cache and perform transform calculations to generate transformed data 128 which would be stored in devices 108. As indicated at 208, transformed data may be provided as application data concurrent with the performance of the transform operations or from the storage devices 108. CPUs may be used to retrieve transformed data from the data storage devices.

Transformed data 128 may be generated from raw data 126 residing on storage devices 108. For example, one or more GPUs 112 could copy extents of raw data from storage devices 108 into the shared memory cache 104 and generate transformed data 128 from the copy of raw data in the cache. The GPUs could then store that transformed data in storage devices 108, provide the transformed data to the host as application data 124, or both. It will therefore be apparent that raw data in storage devices 108 could be transformed in order to provide application data 124 in response to an IO request, or transformed data 128 already stored on the storage devices 108 could be used to provide application data 124 in response to an IO request. CPUs may be used to retrieve transformed data from the data storage devices, whereas GPUs may be used to transform raw data to provide application data on the fly.

The GPUs 112 may perform transform operations in reverse. For example, if an instance of an application 118 writes application data at 208 then that data may be copied into the shared memory cache and later destaged, e.g., stored in the storage devices as indicated at 206 by updating the transformed data in storage devices 108. Further, the transform may be applied in reverse by the GPUs at 204 to determine the corresponding raw data which would be used to update the raw data maintained in storage devices 108 as indicated at 202. Hence, consistency between the raw data and the corresponding transformed data may be maintained.

Figure 3:
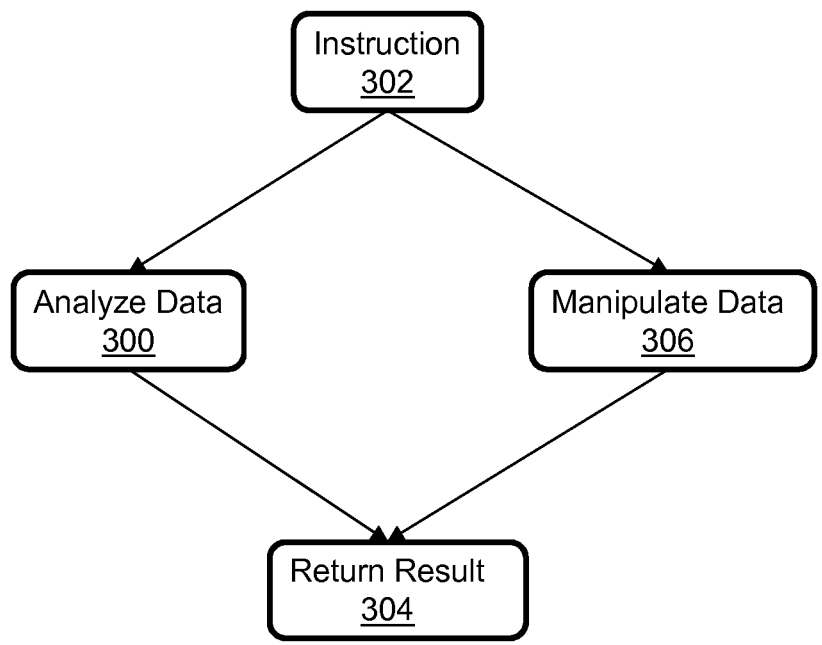
FIG. 3 illustrates data analysis and manipulation using heterogeneous parallel processors.

Referring now to FIG. 3, the GPUs may be used to perform analytic calculations 300 in response to an instruction 302. For example, pattern matching by GPUs may be implemented to support generation of application data in response to an internally or externally generated instruction to return a result 304. Pattern matching may be useful for data exploration and in support of a database application, among other things. A wide variety of analytic calculations could be implemented by the GPUs. In general, calculations can be assigned to either CPUs or GPUs as a function of the efficiency with which each device is capable of performing the calculations.

The GPUs may be used to perform a variety of calculations to manipulate data 306 to facilitate internal operations of the storage array 100. Some of the functions that may be performed by the storage array include but are not limited to mirroring sets of data, cloning sets of data, compressing sets of data, decompressing sets of data, encrypting sets of data, decrypting sets of data, performing deduplication, parity and CRC, and automated storage tiering. Some of the calculations required to support functions performed by the storage array may be performed by GPUs. For example and without limitation, pattern matching in support of functions such as deduplication may be performed more efficiently by GPUs than CPUs. The calculations required to support a function may be split between the CPUs and CPUs in accordance with the efficiency of performing those calculations by each type of device.

GPUs may support data analysis and manipulation calculations which would be impractical to perform with CPUs alone. For example, the massively parallel computing capabilities of the interconnected GPUs may support calculations associated with an unsupervised neural-net algorithm to make storage tiering decisions that would not be practical using a fixed algorithm. This may be particularly useful in multi-tenant systems, federated systems, and for large organizations where data access patterns and/or application types and requirements may be difficult to determine or model.

Figure 4:
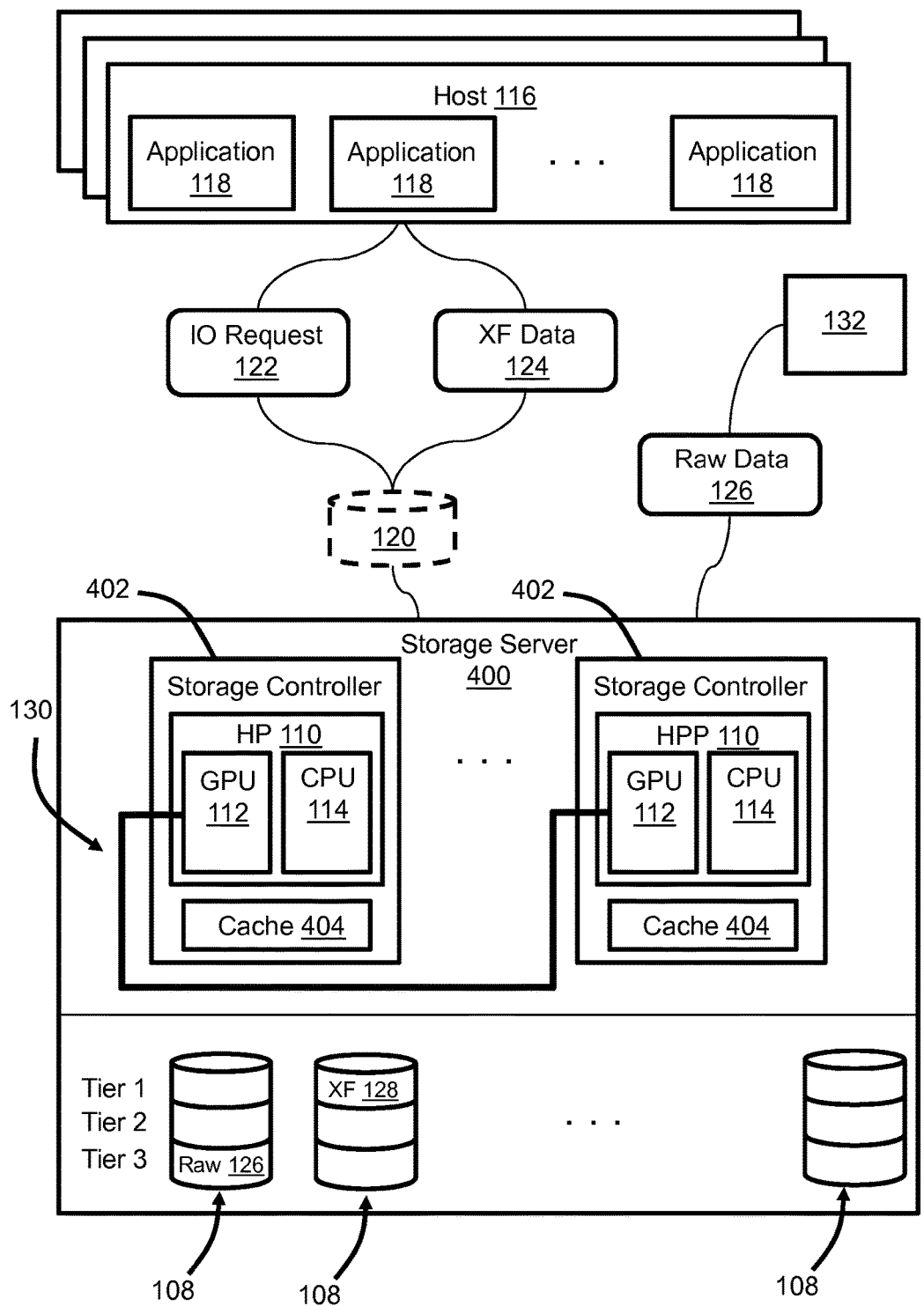
FIG. 4 illustrates a storage server with heterogeneous parallel processors.

FIG. 4 illustrates a data storage system which includes a storage node such as a storage server 400. The storage server 400 may be part of a cluster of storage servers which maintain data and support IOs associated with a large number of concurrent users. Each storage server 400 includes one or more storage controllers 402. Each storage controller includes one or more HPPs 110 and a local memory cache 404. Each HPP may include GPUs 112 and CPUs 114. Both the GPUs and the CPUs have access to their local memory cache 404 and a set of non-transitory storage devices 108 which may be part of or separate from the storage server. Both the GPUs and CPUs can interface with other devices such as host devices 116. The GPUs may be interconnected via communication links 130 which are dedicated to the GPUs. The communication links may include a wide variety of architectures and implementations as already described above. Although the architecture of the storage server 400 differs from that of the storage array 100 (FIG. 1), some or all of the same functions can be facilitated and performed by the GPUs associated with the storage controllers 402. For example, the GPUs 112 may be used to perform ETL transactions which produce transformed data 128 from raw data 126. In one example the storage server stores both raw data 126 and transformed data 128 in storage devices 108, and provides transformed data as application data 124 to instances of an application 118 running on host 116. The GPUs may also be used to perform analytic calculations on data, including but not limited to pattern matching, and to perform a variety of calculations to facilitate operation of the storage server 400, including but not limited to mirroring sets of data, cloning sets of data, compressing sets of data, decompressing sets of data, encrypting sets of data, decrypting sets of data, deduplication, parity and CRC, and automated storage tiering.

Some aspects, features and implementations may comprise computer components and computer-implemented steps or processes that will be apparent to those skilled in the art. For example, it should be understood by one of skill in the art that the computer-implemented steps or processes may be stored as computer-executable instructions on a non-transitory computer-readable medium. Furthermore, it should be understood by one of skill in the art that the computer-executable instructions may be executed on a variety of physical processor devices. For ease of exposition, not every step or element is described herein as part of a computer system, but those skilled in the art will recognize steps and elements that may have a corresponding computer system or software component. Such computer system and software components are therefore enabled by describing their corresponding steps or elements, and are within the scope of the disclosure.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
   at least one non-transitory data storage device; and
   at least one storage controller adapted to present a logical storage device to a host device, maintain a mapping between the logical storage device and the at least one non-transitory data storage device; and provide the host device with access to the at least one non-transitory data storage device in response to a request which references the logical storage device, the at least one storage controller comprising a heterogeneous parallel processor comprising at least one central processing unit and at least one graphics processing unit.

2. The apparatus of claim 1 further comprising a shared memory cache, and wherein the at least one storage controller comprises at least one front end controller which has access to the shared memory cache and presents the logical storage device, and at least one back end controller which has access to the shared memory cache and the at least one non-transitory data storage device.

3. The apparatus of claim 1 comprising a plurality of heterogeneous parallel processors comprising graphics processing units which are interconnected by at least one dedicated communication link.

4. The apparatus of claim 1 wherein the at least one graphics processing unit is adapted to generate transformed data from raw data.

5. The apparatus of claim 4 wherein the raw data and the corresponding transformed data are stored on the at least one non-transitory data storage device.

6. The apparatus of claim 5 wherein the at least one central processing unit is adapted to provide extents of the transformed data stored on the at least one non-transitory data storage device to the host device.

7. The apparatus of claim 4 wherein the transformed data is provided to the host device by the at least one storage controller.

8. The apparatus of claim 1 wherein the at least one graphics processing unit is adapted to perform analytic calculations to support an application running on the host device.

9. The apparatus of claim 8 wherein the analytic calculations comprise pattern matching.

10. The apparatus of claim 1 wherein the at least one graphics processing unit is adapted to perform analytic calculations to support internal operations.

11. The apparatus of claim 1 wherein the at least one graphics processing unit is adapted to perform analytic calculations to support an unsupervised neural-net algorithm for storage tiering.

12. A method comprising:
    storing data on at least one non-transitory data storage device;
    with at least one storage controller:
        presenting a logical storage device to a host device;
        maintain a mapping between the logical storage device and the at least one non-transitory data storage device; and
        providing the host device with access to the at least one non-transitory data storage device in response to a request which references the logical storage device, the at least one storage controller comprising a heterogeneous parallel processor with at least one central processing unit and at least one graphics processing unit; and
    selectively performing calculations with ones of the at least one graphics processing unit.

13. The method of claim 12 further comprising performing distributed calculations by multiple graphics processing units via at least one dedicated communication link.

14. The method of claim 12 further comprising the at least one graphics processing unit generating transformed data from raw data.

15. The method of claim 14 further comprising storing the raw data and the corresponding transformed data on the at least one non-transitory data storage device.

16. The method of claim 12 further comprising the at least one graphics processing unit performing analytic calculations to support an application running on the host device.

17. The method of claim 12 further comprising the at least one graphics processing unit performing pattern matching.

18. The method of claim 12 further comprising the at least one graphics processing unit performing analytic calculations to support internal operations.

19. The method of claim 12 further comprising the at least one graphics processing unit performing analytic calculations to support an unsupervised neural-net algorithm for storage tiering.

* * * * *